United States Patent

[11] 3,626,061

[72] Inventors John C. Babcock;
J. Allan Campbell, both of Kalamazoo, Mich.
[21] Appl. No. 666,466
[22] Filed Sept. 8, 1967
[45] Patented Dec. 7, 1971
[73] Assignee The Upjohn Company
Kalamazoo, Mich.
Continuation-in-part of application Ser. No. 114,621, June 5, 1961, now Patent No. 3,341,557, Continuation-in-part of application Ser. No. 69,557, Nov. 6, 1960, now abandoned. This application Sept. 8, 1967, Ser. No. 666,466

[54] COMPOSITIONS COMPRISING 7α-METHYL-17α-ALKYLATED ESTRADIOLS
6 Claims, No Drawings
[52] U.S. Cl.................................................. 424/238,
260/397.5, 260/239.55, 260/397.4, 195/51
[51] Int. Cl...................................................C07c169/08
[50] Field of Search......................................... 260/397.5

[56] References Cited
UNITED STATES PATENTS
3,318,929 5/1967 Anner et al.................. 260/397.4
FOREIGN PATENTS
1,434,174 2/1966 France......................... 260/397.5
1,434,175 2/1966 France......................... 260/397.5

Primary Examiner—Elbert L. Roberts
Attorneys—Willard L. Cheesman and John Kekich CLAIM: This invention relates to novel 7α-methyl-17α-alkylated estradiols and processes for their preparation; more particularly to those compounds embraced by the formula (11)

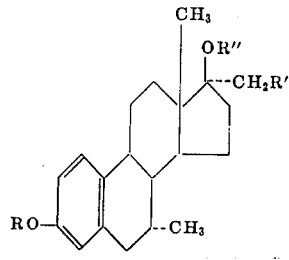

wherein R is selected from the group consisting of hydrogen, the acyl radical of a hydrocarbon carboxylic acid containing from one through 12 carbon atoms, an alkyl radical containing from one through 8 carbon atoms, tetrahydrofuranyl, tetrahydropyranyl, 5-substituted tetrahydropyranyl, and a silyl radical of the formula

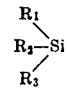

wherein $R_1$, $R_2$ and $R_3$ are selected from the group consisting of alkyl of one through eight carbon atoms and phenyl, R' is selected from the group consisting of hydrogen, methyl, ethyl and 1-propynyl, and R" is selected from the group consisting of hydrogen, the acyl radical of a hydrocarbon carboxylic acid containing from one through 12 carbon atoms, and a silyl radical of the formula

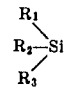

where $R_1$, $R_2$ and $R_3$ have the same meaning as above. It also relates to 7α-methyl-17α-alkenylestradiols (11a) and their preparation.

COMPOSITIONS COMPRISING 7α-METHYL-17α-ALKYLATED ESTRADIOLS

CROSS REFERENCES TO RELATED APPLICATIONS

This application is a continuation-in-part of Application Ser. No. 114,621, filed June 5, 1961, now Pat. No. 3,341,557 which is in turn a continuation-in-part of abandoned Application Ser. No. 69,557, filed Nov. 6, 1960.

BRIEF SUMMARY OF THE INVENTION

The 7α-methyl-17α-alkylated estradiols of Formula II, above, wherein R' is hydrogen, methyl or ethyl, can be prepared by the known methods described below.

1. By treating 7α-methylestrone (I) (or the 3-methyl ether, 3-cyclopentyl ether, or 3-tetrahydropyranyl ether with an alkyl-lithium (e.g., methyl lithium, ethyl lithium, propyl lithium, butyl lithium, etc.) to yield the corresponding 7α-methyl-17α-alkylestradiol (II), or its 3-ether. The reaction is conducted advantageously in the presence of an inert solvent such as ether, benzene, toluene, etc. The lithium compound is employed advantageously in excess of the stoichiometric proportion, preferably in an amount of at least 1.5 moles per mole of starting material (II).

2. By treating 7α-methylestrone (I) (or its 3-ether with an appropriate Grignard reagent, i.e., an alkyl magnesium halide such as methyl magnesium bromide, ethylmagnesium bromide, propylmagnesium bromide, isopropylmagnesium iodide, butyl magnesium iodide, etc., in the presence of a solvent such as ether, tetrahydrofuran, benzene and the like, to produce the corresponding 7α-methyl-17α-alkylestradiol (II), or its 3-ether. Preferably, the Grignard reagent is employed in an excess of the order of 10 moles per mole of starting material (II).

3. By hydrogenating a 7α-methyl-17α-alkynylestradiol (or its 3-ether or 3acylate), e.g., in the presence of a suitable hydrogenation catalyst (such as palladium on charcoal) to obtain the corresponding 7α-methyl-17α-alkylestradiol (II), its 3-ether or 3-acylate. The 7α-methyl-17α-alkynylestradiol starting materials are prepared by treating 7α-methylestrone (I) (or its 3-ether) with an alkali metal derivative such as sodium acetylide, sodium methylacetylide, potassium acetylide, potassium methylacetylide, etc., in the presence of an inert solvent such as dioxane, dimethylformamide or dimethylsulfoxide.

The 7α-methyl-17α-alkylated estradiols of Formula II, above, wherein R' is 1-propynyl, can be prepared by treating 7α-methylestrone (I) (or the 3-methyl ether, 3-cyclopentyl ether, or 3-tetrahydropyranyl ether) with a 2-butynylhalomagnesium Grignard reagent (prepared from a 1-halo-2-butyne and magnesium in ether), to yield 7α-methyl-17α-(2-butynyl)estradiol (II), or its 3-ether.

The 3-ethers of the 7α-methyl-17α-alkylated estradiols of Formula II, above, can also be prepared by the known methods described below.

1. By treating a 7α-methyl-17α-alkylated estradiol (II) in accordance with the procedures disclosed in British Pat. No. 909,662, i.e., with an alkyl (or cycloalkyl) halide and an alkali metal alkylate, preferably at reflux temperature, to give a 3-alkyl (or cycloalkyl) ether of the 7α-methyl-17α-alkylated estradiol (II).

2. By treating a 7α-methyl-17α-alkylated estradiol (II) with an alkylating agent (e.g., a dialkylsulfate) in conventional manner, to give a 3-alkyl ether of the 7α-methyl-17α-alkylated estradiol (II).

3. By treating a 7α-methyl-17α-alkylated estradiol (II) with a cyclic enol ether (e.g., dihydrofuran, dihydropyran, 5-hydroxymethyldihydropyran, 5-carboxydihydropyran, etc.) at low temperature, preferably in the presence of an acidic catalyst (e.g. phosphorus oxychloride), to give the corresponding 3-ether (e.g. tetrahydrofuranyl, tetrahydropyranyl, 5-hydroxymethyltetrahydropyranyl, etc.) of the 7α-methyl-17α-alkylated estradiol (II).

4. By treating a 7α-methyl-17α-alkylated estradiol (II) with a diazoalkane (e.g. diazomethane, diazoethane, diazobutane, etc.) at ambient temperature in an inert solvent such as ether, ethylene glycol dimethyl ether, etc., to give the corresponding 3-alkyl ether of the 7α-methyl-17α-alkylated estradiol (II).

5. By treating a 7α-methyl-17α-alkylated estradiol (II) with a disilazane of the formula

wherein $R_1$, $R_2$ and $R_3$ have the same meaning as above (e.g., hexamethyldisilazane, symmetrical diphenyltetramethyldisilazane, 1-methyl-1,1-dibutyl-3-phenyl-3,3-dimethyldisilazane, hexa-amyldisilazane, etc.) to yield a corresponding 3-silyl ether of the 7α-methyl-17α-alkylated estradiol (II) and 3,17-bissilyl ether of 7α-methyl-17α-alkylated estradiol (II), which can be separated by conventional procedures.

The 3-acylates of the compounds of formula II, above, are prepared by known methods for the esterification of 3-hydroxysteroids, for example, by treating the appropriate 7α-methyl-17α-alkylated estradiol (II), wherein R is hydrogen, with the desired organic carboxylic acid anhydride (or chloride) in the presence of an esterification catalyst, such as pyridine, at from about 0° to 30° C.

The 3,17-diacylates of the compounds of formula II, above, are prepared by known methods for the diesterification of 3,17-dihydroxysteroids, e.g., by treating the appropriate 7α-methyl-17α-alkylated estradiol (II), wherein R and R'' are hydrogen, with the desired organic carboxylic acid anhydride (or chloride) in refluxing pyridine. When R is alkyl, the corresponding 7α-methyl-17α-alkylated estradiol 3-ether 17-acylate (II) is obtained by the foregoing procedure.

The 17-esters of the compounds of formula II, above, wherein R is alkyl, are also prepared by mixing together the appropriate 7α-methyl-17α-alkylated estradiol (II) and an organic carboxylic acid in the presence of trifluoroacetic anhydride. The foregoing procedure when applied to compounds of formula II wherein R is hydrogen, first yields the 3,17-diesters; mild alkaline hydrolysis of the thus produced compounds, or chromatography through a column of alumina (Grade 11) (basic) removes the 3-ester group and yields the 17-monoesters.

The 7α-methylestrone (I) starting material of (1) and (2), above, can be prepared by several known methods described below.

1. By fermentation of 7α-methyl-19-nortestosterone (I) or 7α-methyl-19-nor-4-androstene-3,17-dione with a micro-organism or its enzymes capable of introducing a double bond in the 1(2) or 1(2)- and 4(5)- positions of the sterioid nucleus, e.g. *Corynebacterium simplex* or *Septomyxa affinis*, to yield 7α-methylestrone (I).

2. By catalytically dehydrogenating 7α-methyl-19-nor-4-androstene-3,17-dione at the 1(2)-positions, e.g., by heating in the presence of a hydrogenation catalyst (e.g., palladium on charcoal) in a high boiling solvent (e.g., cymene), to give 7α-methylestrone (I).

3. By treating 7α-methyl-19-nor-4-androstene-3,17-dione with a chemical dehydrogenating agent, e.g., a quinone such as 2,3-dichloro-5,6-dicyanobenzoquinone (DDQ) or 2,3,5,6-tetrachloro-1,4-benzoquinone (Chloranil), or selenium compounds such as selenium dioxide or dibenzoyloxy selenium oxide, to yield 7α-methylestrone (I).

4. By pyrolysis of 7α-methyl-1,4-androstadiene-3,17-dione at elevated temperatures (e.g., between about 400 to 600° C. ) in high boiling diluents (e.g., heavy mineral oil) to give 7α-methylestrone (I).

5. By treating 7α-methyl-1,4-androstadiene-3,17-dione in accordance with the procedures described in J. Amer. Chem. Soc. 86, 742, i.e., with lithium and diphenyl in the presence of diphenyl methane and employing tetrahydrofuran as solvent, to yield 7α-methylestrone (I).

The 3-ethers of 7α-methylestrone (I) can be prepared by the known methods described above for the preparation of the 3 ethers of 7α-methyl-17α-alkylated estradiols (II).

The 3-acylates of 7α-methylestrone (I) can be prepared by conventional procedures, by treating 7α-methylestrone (I) with the appropriate organic carboxylic acid anhydride (or chloride) at moderate temperatures in the presence of an esterification catalyst such as pyridine, to yield the corresponding 7α-methylestrone 3-acylate (I).

All of the compounds included within formulas I, 11 and IIa, above, can be isolated from their respective reaction mixtures by conventional means, for example, when a water-miscible solvent is used, by pouring the reaction mixture into water and separating the resulting precipitate by filtration or by extraction with water-immiscible solvents. Additional purification of the products can be accomplished by conventional means, for example, by elution chromatography from an adsorbent column with a suitable solvent such as acetone, methanol, dilute methanol, ethanol, ether, methylene chloride and Skellysolve B (hexanes), mixtures and combinations of these solvents; also by gradient elution chromatography from an adsorbent column with a suitable mixture of solvents, such as, methylene chloride-Skellysolve B, acetone-Skellysolve B, and the like.

The compounds of formulas II and IIa of the present invention are potent estrogens when administered either orally or parenterally; e.g., when assayed in rats by the Allen-Doisy test 7α,17α-dimethyl estradiol was found to have approximately seven times the activity of estradiol. The compounds of formula II when administered to mammals, birds, and animals, are also active in lowering cholesterol in the blood, inhibiting gonadotropin secretion, producing anabolic response, especially in providing nitrogen retention, and in supplying calcium lost as a result of osteoporosis. In addition, the compounds of formula II, when combined with progestins such as 6α-methyl-17α-hydroxyprogesterone 17-acetate (Provers), 7α-methyl-17α-ethynyl-19-nortestosterone, 17α-hydroxy-6-methyl-16methylene-4,6-pregnadiene-3,20-dione 17-acetate (Melengestrol acetate), 17-hydroxy-19-nor-17α-pregn-(10)-en-20-yn-3-one (Norethynordrel), 19-nor-17α-pregn-4-en-20-yne-3β,17-diol-diacetate (Ethynodiol diacetate), 17 hydroxy-19-nor-17α-pregn-4-en-20-yn-3-one (Norethindrone), the corresponding 17-acetate (norethindrone acetate), 6α,21-dimethyl-17β-hydroxy-4-pregnen-20-yn-3-one (Dimethisterone), 6-chloro-17α-hydroxy-4,6-pregnadiene-3,20-dione 17-acetate, etc., are useful for the prevention of ovulation in mammals. The foregoing properties make the new compounds useful in veterinary practice.

The compounds of the invention can be prepared and administered to mammals, birds and animals, in a wide variety of oral or parenteral dosage forms, singly or in admixture with other coacting compounds. They can be administered with a pharmaceutical carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups, or elixirs.

DETAILED DESCRIPTION

It is to be understood that the invention is not to be limited to the exact details of operation or exact compositions shown and described herein, as obvious modifications and equivalents will be apparent to one skilled in the art, and the invention is therefore to be limited only by the scope of the appended claims.

EXAMPLE 1

7α-methylestrone(7α-methyl-2,3,5(10)-estratrien-3-ol-17-one) (I)

To 10 l. of sterile glucose-yeast extract medium there was added an inoculum of 500 ml. of Corynebacterium simplex ATCC 6946. The culture was stirred and aerated for about 48 hours at a temperature of about 28° C., lard oil being added to suppress the foam. After about 48 hours the pH was 6.1. To the fermentor, 1 g. of 7α-methyl-19-nortestosterone, prepared as in Steroids 1, 317, was added and aeration continued for about 24 hours. At this time the pH was 6.5. The beer was adjusted to pH 3 with hydrochloric acid and extracted four times with 3 l. of methylene chloride. Paper chromatography of an aliquot of the solvent extract indicated, b the Bush B–3 system, that essentially all of the 7α-methyl-19-nortestosterone had been reacted and that two compounds showing the characteristics of aromatic A ring steroids were present. The less polar compound had the mobility of 7α-methylestrone (I) and the more polar that of 7α-methylestradiol. The methylene chloride extracts were evaporated to dryness and the residues obtained used for isolating the fermentation products. The crude residue was dissolved in methylene chloride and chromatographed through 1 150 gm. Florisil (synthetic magnesium silicate) column packed wet with Skellysolve B(hexanes) and eluted with 400 ml. fractions by gradient elution between 5 l. of 4 percent acetone-Skellysolve B and 5 l. of 12 percent acetone-Skellysolve B. Fractions 4 through 7 gave well formed crystals. These fractions were combined and recrystallized from methanol with Darco (activated charcoal) treatment to give 0.45 g. of 7α-methylestrone (I), melting at 237 to 238° C.; $\lambda_{max}^{alc.}$ 280 m$\mu$; $\epsilon$=2,100.

Anal. Calcd. for $C_{19}H_{24}O_2$: C, 80.21; H, 8.51.

Found: C, 80.10; H, 8.34.

7α-methylestradiol can be isolated from the more polar fractions.

EXAMPLE 2

7α-methylestrone (I)

A sterile medium was prepared containing 10 l. of tap water, 20 g. of cornsteep liquors and 100 g. of commercial dextrose and adjusted to pH 5 with sodium hydroxide. This was inoculated with 500 ml. of a vegetative growth of Septomyxa affinis (ATCC 6737) grown on the same medium. The culture was stirred and aerated at a rate of 0.1 l./minute. At the end of about 24 hours the pH was 7. To the fermentor, 2 g. of 7α-methyl-19-nortestosterone and 0.1 g. of 3-ketobisnor-4-cholen-22-al dissolved in 20 ml. of N,N-dimethylformamide was added. Aeration was continued for about 48 hours, the pH adjusted to 3 and the beer extracted four times with methylene chloride. Paper chromatography indicated the presence of 7α-methylestrone (I) in the extract. The product (I) can be isolated in accordance with the procedure described in example 1 to give essentially pure 7α-methylestrone (I)

Following the procedure of examples 1 and 2 but substituting 7α-methyl-19-nor-4-androstene-3,17-dione for 7α-methyl-19-nor-testosterone also yields 7α-methylestrone (I)

EXAMPLE 3

7α-methylestrone (I)

A mixture of 100 mg. of 7α-methyl-19-nor-4-androstene-3,17-dione, 40 mg. of 5 percent palladium on charcoal catalyst in 100 ml. of p-cymene (purified by passing through a column of alumina) was refluxed for about 1.5 hours. The catalyst was filtered off and the filtrate concentrated in a rotary evaporator. The residue was crystallized from ether to give 25 mg. of 7α-methylestrone (I), melting at 218 to 230° C., $\lambda_{max}^{alc.}$ 279 $\mu$, $\epsilon$=2,150. Infrared spectral analysis indicates it is the same compound as prepared in examples 1 and 2. The product (I) can be further purified by recrystallization or chromotography to give pure 7α-methylestrone (I).

EXAMPLE 4

7α-methylestrone (I)

To a solution of 100 mg. of 7α-methyl-19-nor-4-androstene-3,17-dione, 100 mg. of 2,3-dichloro-5,6-dicyanobenzoquinone (DDQ) and 0.5 ml. of acetic acid in 3 ml. of dioxane, 2 drops of 2.8 N hydrochloric acid solution in dioxane was added. After standing for about 16 hours, methylene chloride was added to the mixture and the DDQ filtered off. The filtrate was dried and the solvent removed. The residue, weighing about 30 mg., was triturated with methanol to give about 1 mg. of 7α-methylestrone (I) with $\lambda_{max}^{alc}$. 280 μ, ε=2,350. Infrared analysis indicated that the thus produced compound is the same as those prepared in examples 1, 2 and 3.

Following the procedure of example 4, but substituting selenium dioxide or tetrachloro-p-benzoquinone (chloranil) for DDQ, also yields 7α-methylestrone (I).

EXAMPLE 5

7α-methylestrone (I)

A pyrolysis tube (18 inches × 1 inch) equipped with thermocouples about 3 inches from each end and packed with glass tubing cut in about one-quarter inch lengths was heated to about 550° C. and heavy mineral oil passed through at a rate of 5 ml./minute until constant temperature of 500 to 510° C. at the top and 540 to 560° C. at the bottom was obtained. A mixture of 10.4 g. of 7α-methyl-1,4-androstadiene-3,17-dione and 500 ml. of heavy mineral oil mixed in a Waring blender was added at a rate of 5 ml./minute, maintaining the above temperatures. The effluent was refrigerated for several hours and the crystalline precipitate collected, washed thoroughly with Skellysolve B and dried to give 6.7 g. of crude 7α-methylestrone (I). It was dissolved hot methylene chloride, cooled and poured on a 350 g. Florisil column packed wet with Skellysolve B and eluted with 400 ml. fractions by gradient elution between 5 l. of 4 percent acetone-Skellysolve B and 5 l. of 12 percent acetone-Skellysolve B. The desired product was contained in fractions 10 through 21. The residues obtained from these fractions were combined and recrystallized from methanol to give 3.75 g. of 7α-methylestrone (I), having a melting point of 230 to 235° C.; $[\alpha]_D +140°$ (chloroform); $\lambda_{max}^{alc}$. 279 μ; ε=2,250. Its nuclear magnetic resonance (NMR) spectrum confirms the proposed structure and infrared spectral analysis shows it is the same as the product obtained in examples 1, 2, 3 and 4.

EXAMPLE 6

7α-methylestrone (I)

Treating 7α-methyl-1,4-androstadiene-3,17-dione in accordance with the procedures described in J. Amer. Chem. Soc. 86 742, namely, with lithium and diphenyl in the presence of diphenyl methane and employing tetrahydrofuran as solvent, yields 7α-methylestrone (I).

EXAMPLE 7

7α-methylestrone 3-cyclopentyl ether (I)

A mixture of 1 g. of 7α-methylestrone (I) and 1 g. of cyclopentyl bromide is added slowly to a solution of sodium ethylate (prepared from 0.1 g. of sodium and 8 ml. of absolute ethanol.) The reaction mixture is heated to reflux for about 4 hours, the ethanol removed by distillation and the residue treated with a small amount of water. A precipitate of 7α-methylestrone 3-cyclopentyl ether (I) is obtained which is crystallized from a mixture of methylene chloride and methanol.

EXAMPLE 8

7α-methylestrone 3-methyl ether (1)

To 4 g. of 7α-methylestrone (I) in a solution containing 6.4 g. of potassium hydroxide, 14 ml. of water and 21 ml. of methanol, 14 ml. of dimethyl sulfate was added dropwise with stirring and cooling sufficient to keep the reaction temperature at 25 to 35° C. At the same time a solution of 14 g. of potassium hydroxide in 28 ml. of water and 42 ml. of methanol was added dropwise at a rate that kept the pH of the reaction mixture about 10. The addition of the dimethylsufate required about 30 minutes and the addition of the potassium hydroxide solution about 1 hour. The reaction mixture was stirred an additional 1.5 hours. Water was added and the crystalline product collected on a filter, washed with water and dried to yield 3.8 g. of product (I) melting at 155 to 163° C. It was recrystallized from methanol to give an analytical sample of 7α-methylestrone 3-methyl ether (I) melting point 163 to 165°; $\lambda_{max}^{alc}$. 276 μ; ε=2,100; $\lambda_{max}^{alc}$. 286 μ; ε=2,050.

Anal. Calcd. for $C_{20}H_{28}O_2$: C, 79.95; H, 9.39.
Found: C, 80.28; H, 9.48.

Following the procedure of example 8 but substituting for dimethylsulfate the following:

(1) diethylsulfate,
(2) dipropylsulfate,
(3) diisopropylsulfate,
(4) dibutylsulfate,
(5) di-s-butylsulfate,
(6) dipentylsulfate,
(7) dihexylsulfate,
(8) diheptylsulfate and
(9) dioctylsulfate, yields, respectively,
(1) 7α-methylestrone 3-ethyl ether (I),
(2) 7α-methylestrone 3-propyl ether (I),
(3) 7α-methylestrone 3-isopropyl ether (I),
(4) 7α-methylestrone 3-butyl ether (I),
(5) 7α-methylestrone 3-s-butyl ether (I),
(6) 7α-methylestrone 3-pentyl ether (I),
(7) 7α-methylestrone 3-hexyl ether (I),
(8) 7α-methylestrone 3-heptyl ether (I), and
(9) 7α-methylestrone 3-octyl ether (I).

EXAMPLE 9

7α-methylestrone 3-tetrahydropyranyl ether (I)

To a solution of 4 g. of 7α-methylestrone (I) in 40 ml. of tetrahydrofuran (purified by percolation through a column of alumina) and 8 ml. of freshly distilled dihydropyran, 0.4 ml. of phosphorus oxychloride was added dropwise with stirring under nitrogen and cooling in an ice bath. After the addition was completed the ice bath was removed and after an additional 15 minutes the reaction mixture was poured into a mixture of saturated solution of sodium bicarbonate, ether and ice. The ether layer was separated, washed with dilute sodium bicarbonate solution, water, dried over sodium sulfate and filtered. The filtrate was evaporated to dryness to give 5.1 g. of 7α-methylestrone 3-tetrahydropyranyl ether (I).

Following the procedure of example 9 but substituting for dihydropyran the following:

(1) dihydrofuran,
(2) 5-hydroxymethyldihydropyran,
(3) 5-carboxydihydropyran, etc., yields, respectively,
(1) 7α-methylestrone 3-tetrahydrofuranyl ether (I),
(2) 7α-methylestrone 3-(5-hydroxymethyl)tetrahydropyranyl ether (I),
(3) 7α-methylestrone 3-(5-carboxy)tetrahydropyranyl ether (I), etc.

EXAMPLE 10

7α-methylestrone 3-acetate (I)

To 1 g. of 7α-methylestrone (I) 2 ml. of pyridine and 1 ml. of acetic anhydride is added. The reaction mixture is kept at room temperature for about 3 hours; water is then added to precipitate the product (I) and destroy the excess acetic anhydride. Recrystallization from acetone and Skellysolve B yields 7α-methylestrone 3-acetate (I).

Following the procedure of example 10 but substituting for acetic anhydride the following:

(1) benzoic acid anhydride,
(2) propionic anhydride,
(3) butyryl chloride,
(4) i-valeryl chloride,
(5) decanoyl chloride,
(6) hexanoic anhydride,
(7) sec. octanoic anhydride
(8) capric anhydride,
(9) undecyl anhydride,
(10) dodecanoyl chloride, etc., yields, respectively,
(1) 7α-methylestrone 3-benzoate (I), (2) 7α-methylestrone 3-propionate (I),
(3) 7α-methylestrone 3-butyrate (I),
(4) 7α-methylestrone 3-i-valerate (I),
(5) 7α-methylestrone 3-decanoate (I),
(6) 7-methylestrone 3-hexanoate (I),
(7) 7α-methylestrone 3-sec. octanoate (I),
(8) 7α-methylestrone 3-caproate (I),
(9) 7α-methylestrone 3-undecanoate (I),
(10) 7α-methylestrone 3-dodecanoate (I), etc.

EXAMPLE 11

7α-methylestrone 3-trimethylsilyl ether (I)

To a suspension of 4 g. of 7α-methylestrone (I) in 10 ml. of dry acetone, 6.5 ml. of hexamethyldisilazane was added. The mixture was stirred for about four days and then evaporated to dryness. The residue was dissolved in a mixture of methylene chloride and Skellysolve B and chromatographed over a 250 g. column of Florisil. Gradient elution between 5 l. of Skellysolve B and 5 l. of 10 percent acetone-90 percent Skellysolve B yielded 2.5 g. of 7α-methylestrone 3-trimethylsilyl ether (I) having a melting point of 103 to 107° C.

Following the procedure of example 11 but substituting other disilazanes for hexamethyldisilazane, such as symmetrical diphenyltetramethyldisilazane, hexaamyldisilazane, etc., yields, respectively, 7α-methylestrone 3-phenyldimethylsilyl ether (I), 7α-methylestrone 3-triamylsilyl ether (I), etc.

The reactions of example 11 and the paragraph thereafter are preferably carried out with the addition of a few drops to 2 ml. of trimethylsilyl chloride.

In place of acetone in example 11, other inert dry solvents, such as tetrahydrofuran, dioxane, methylene chloride and the like, can be utilized.

EXAMPLE 12

7α,17α-dimethylestradiol    [7α,17α-dimethylestra-1,3,5 (10)-triene-3,17β-diol](II)

To a dry flask filled with nitrogen and containing 300 mg. of 7α-methylestrone (I), 10 ml. of a 1.4 N ether solution of methyl lithium was added. The reaction mixture bubbled vigorously at first and then became clear. It was refluxed for about 1 hour and then the excess methyl lithium destroyed by dropwise addition of water. The solution was acidified with 2N hydrochloric acid and 1 ml. of methanol added to loosen the precipitate. The product was collected, washed with water, dried, recrystallized twice from moist methylene chloride to give 165 mg. of 7α,17α-dimethylestradiol (II), melting at 193 to 196° C.; $\lambda_{max}^{alc}$. 280 $\mu$; $\epsilon$=2,200.

Anal. Calcd. for $C_{21}H_{28}O_2$: C, 79.95; H, 9.39.

Found: C, 79.92; H, 9.28.

Using the procedure of example 12 but replacing methyl lithium by ethyl lithium, propyl lithium and butyl lithium, yields, respectively, 7α-methyl-17α-ethylestradiol (II), 7α-methyl-17α-propylestradiol (II) and 7α-methyl-17α-butylestradiol (II).

Following the procedure of example 12 and the paragraph thereafter, but substituting 7α-methylestrone 3-methyl ether (I) and 7α-methylestrone 3-cyclopentyl ether (I) as starting materials, yields the corresponding 7α-methyl-17β-hydroxy-17α-alkyl compounds (II).

EXAMPLE 13

7α-17α-dimethylestradiol (II)

A solution of 2.75 g. of 7α-methylestrone (I) in 70 ml. of tetrahydrofuran is added over a short period with stirring under an atmosphere of nitrogen to 25 ml. of a 3M solution of methylmagnesium bromide in diethyl ether. The resulting mixture is distilled until the vapor temperature reaches 55° C. and the residue is then heated under reflux for approximately 4 hours. To the mixture so obtained is added carefully with stirring an iced ammonium chloride solution followed by 130 ml. of methanol and 25 ml. of 5 percent aqueous sodium hydroxide. The mixture is stirred at 40° C. under nitrogen for several hours and is concentrated to about one-third volume under reduced pressure. The resulting mixture is diluted with water and extracted with ether. The ether extract is washed successively with water, dilute hydrochloric acid, dilute aqueous sodium carbonate, and water before being dried over anhydrous sodium sulfate and filtered. The filtrate is evaporated to dryness and the residue is dissolved in methylene chloride and chromatographed over 100 g. of Florisil. The column is eluted with Skellysolve B containing increasing proportions of acetone and those fractions of the eluate which on infrared absorption analysis show no C-17 carbonyl absorption are combined and evaporated to dryness. The residue is recrystallized from a mixture of acetone and Skellysolve B. There is thus obtained 7α,17α-dimethylestradiol (II) in the form of a crystalline solid.

Using the above procedure but replacing methylmagnesium bromide by propylmagnesium bromide, isopropylmagnesium bromide, butylmagnesium bromide, allylmagnesium bromide, and 2-butenyl-magnesium bromide, there are obtained 7α-methyl-17α-propyl-estradiol (II), 7α-methyl-17α-isopropylestradiol (II), 7α-methyl-17α-butylestradiol (II), 7α-methyl-17 α-allylestradiol (II) and 7α-methyl-17α-(2-butenyl)estradiol (II), respectively. With the more sterically bindered Grignard reagents, some reduction of the 17-ketone also occurs and chromatography is preferable to obtain the purified 7α-methyl-17α-substituted estradiol (II).

Following the procedure of example 13 and the paragraph thereafter but substituting 7α-methylestrone 3-methyl ether (I) an 7α-methylestrone 3-cyclopentyl ether (I) as starting materials, yields the corresponding 7α-methyl-17β-hydroxy-17α-alkyl counterparts (II).

EXAMPLE 14

7α-methyl-17α-(2-butynyl)estradiol 3-methyl ether (II)

A Grignard reagent was prepared from 14 g. of 1-bromo-2-butyne and 16 g. of magnesium in ether to provide a final volume of 125 ml. To 17 ml. of this reagent, 1 g. of 7α-methylestrone 3-methyl ether (I) was added with stirring under nitrogen. After about 1 hour, ammonium chloride solution was added and the product (II) extracted with ether. The ether extract was washed with water, dried and the solvent removed. The residue was chromatographed through a column of alumina. Some starting material (I) was eluted first. The desired product, 7α-methyl-17α-(2-butynyl)estradiol 3-methyl ether (II) was then eluted as a glassy foam ($\lambda_{max}^{alc}$. 277 $\mu$; $\epsilon$=2,100). The nuclear magnetic resonance (NMR) and infrared spectra support the structure of the product.

Anal. Calcd. for $C_{24}H_{32}O_2$: C, 81.77; H, 9.15.

Found: C, 81.06; H, 9.35.

Using the above procedure, 7α-methylestrone (I) and 7α-methylestrone 3-tetrahydropyranyl ether (I) are converted to 7α-methyl-17α(2-butynyl)estradiol (II) and 7α-methyl-17α-(2-butynyl)estradiol 3-tetrahydropyranyl ether (II), respectively.

EXAMPLE 15

7α-methyl-17α(2-butynyl)estradiol (II) and 7α-methyl-17 α-(1,2-butadienyl)estradiol IIa)

To a slurry of 3 g. of 7α-methylestrone 3-tetrahydropyranyl ether (I) in 20 ml. of ether, 40 ml. of the ether solution of the Grignard reagent prepared in example 13 was added. A gummy precipitate formed and after about 20 hours at room temperature, ammonium chloride solution was added. The reaction mixture was extracted with ether and the extract washed with water, dried over magnesium sulfate, filtered and concentrated to a gummy solid. This was dissolved in 50 ml. of tetrahydrofuran and 0.1 g. of p-toluenesulfonic acid and 2 ml. of water added. After about 20 hours at room temperature, water was added and the product recovered with ether. The unreacted starting material (I) could not be separated from the desired products (II and IIa) by chromatography so the total crude product was dissolved in methanol and treated with sodium borohydride to reduce any 17-keto material present. The excess sodium borohydride was destroyed with a small amount of dilute hydrochloric acid and the steroidal material taken up in ether. The product was chromatographed through a column of Florisil. The butynyl (II) and 1,2-butadienyl (IIa) compounds were eluted together. Crystallization from a mixture of acetone and Skellysolve B gave 120 mg. of 7α-methyl-17α-(1,2-butadienyl)estradiol (IIa) having a melting point of 256 to 268° C., $\lambda_{max}$. 280 μ, $\epsilon$=2,100. The NMR and infrared spectra of the compound support its proposed structure.

Anal. Calcd. for $C_{23}H_{30}O_2$: C, 81.61; H, 8.93.

Found: C, 81.61; H, 9.16.

Concentration of the mother liquors from the 1,2-butadienyl compound (IIa) and recrystallization from a two phase mixture of methylene chloride and water, yielded 150 mg. of 7α-methyl-17α(2-butynyl)estradiol (II), melting at 117 to 123° C. with $\lambda_{max}^{alc.}$ 281 μ, $\epsilon$=2,060. The NMR and infrared spectra of the compound support its proposed structure.

EXAMPLE 16

7α-methyl-17α-ethynylestradiol

To about 30 ml. of liquid ammonia cooled in a Dry Ice (solid carbon dioxide)-acetone bath, 1 g. of potassium was added. Acetylene was added until the blue color disappeared, then 0.3 g. of 7α-methylestrone in 8 ml. of dioxane was added. The resulting solution was refluxed for about one-half hour then most of the ammonia allowed to escape. Water was added, the solution acidified with hydrochloric acid and extracted with ether. The extracts were washed with dilute hydrochloric acid, water, dilute sodium bicarbonate, again with water, dried and the solvent removed. The residue resisted crystallization and was combined with 100 mg. of another run of the same crude product in methylene chloride and then chromatographed through a column of Florisil. The fractions that crystallized on scratching with methylene chloride-water-Skellysolve B then from methylene chloride-Skellysolve B gave 0.28 g. of 7α-methyl-17α-ethynylestradiol, melting at 105° C. with bubbling. On drying at 100° C. under high vacuum the product changed to an amorphous solid with $\lambda_{max}^{alc.}$ 280 μ, $\epsilon$=2,190.

Following the procedure of example 15 but substituting other starting materials for 7α-methylestrone, such as 7α-methylestrone 3-methyl ether, or 7α-methylestrone 3-cyclopentyl ether, etc., yields, respectively, 7α-methyl-17α-ethynylestradiol 3-methyl ether, 7α-methyl-17α-ethynylestradiol 3-cyclopentyl ether, etc.

Alternatively, 7α-methylestrone and its 3-ethers can be converted to the corresponding 7α-methyl-17α-ethynylestradiols by reaction with lithium acetylide-ethylenediamine complex in such solvents as dimethylsulfoxide, dimethylformamide, tetrahydrofuran and other unreactive organic solvents.

Substitution of methylacetylene in example 15 and the paragraphs thereafter yields the corresponding 17α-propynyl derivatives.

EXAMPLE 17

7α-methyl-17α-ethylestradiol 3-methyl ether (II)

A mixture of 6 g. of 7α-methyl-17α-ethynylestradiol 3-methyl ether and 0.5 g. of 5 percent palladium on charcoal catalyst in 250 ml. of 95 percent ethanol was shaken with pressurized hydrogen. After hydrogen uptake ceased (and 2 moles were consumed) the catalyst was filtered off and the filtrate concentrated to dryness. The residue was dissolved in about 200 ml. of Skellysolve B and mixed with Celite (diatomaceous earth). After boiling until the last traces of catalyst were coagulated, the solution was filtered and concentrated for crystallization. The product, 5.4 g. of 7α-methyl-17α-ethylestradiol 3-methyl ether (II) melted at 136 to 140° C., with a rotation $[\alpha]_D$ + 44°, $\lambda_{max}^{alc.}$ 286 μ and $\epsilon$=1,950. The NMR and infrared spectra support the proposed structure of the product.

Anal. Calcd. for $C_{22}H_{32}O_2$: C, 80.44; H, 9.82.

Found: C, 80.06; H, 10.18.

Following the procedure of example 17 but substituting 7α-methyl-17α-ethynylestradiol and 7α-methyl-17α-ethynylestradiol 3-cyclopentyl ether as starting materials, yields, respectively, 7α-methyl-17α-ethylestradiol (I) and 7α-methyl-17α-ethylestradiol 3-cyclopentyl ether (II).

Following the procedure of example 17 and the paragraph thereafter, but substituting 7α-methyl-17α-propynylestradiol and 7α-methyl-17α-(2-butynyl)estradiol as starting materials, yields, respectively, 7α-methyl-17α-propylestradiol, 7α-methyl-17-butylestradiol and their 3-ethers.

Following the procedures of example 17 and the paragraphs thereafter, but replacing the solvent employed in the hydrogenation partly or entirely by pyridine and halting the reduction after the uptake of one equivalent of hydrogen instead of two, the 17α-alkenyl instead of the 17α-alkyl derivatives of the 7α-methyl-17α-alkinylestradiols are obtained. For example, reducing with one equivalent of hydrogen, compounds such as 7α-methyl-17α-ethynylestradiol, 7α-methyl-17α-(2-propynyl)estradiol, 7α-methyl-17α(2-butynyl)estradiol and the 3-cyclopentyl ether and 3-methyl ether thereof, yields, respectively, 7α-methyl-17α-ethenylestradiol, 7α-methyl-17α-(2-propenyl)estradiol, 7α-methyl-17α-(2-butenyl)estradiol and their 3-cyclopentyl ethers and 3-methyl ethers.

EXAMPLE 18

7α,17α-dimethylestradiol 3-methyl ether (II)

Following the procedure of example 8, but substituting 7α,17α-dimethylestradiol for 7α-methylestrone yields 7α,17α-dimethylestradiol 3-methyl ether. Following the procedure of example 8, but substituting 7α,17α-dimethylestradiol for 7α-methylestrone as starting material and additionally substituting for dimethylsulfate the following:

(1) diethylsulfate,
(2) dipropylsulfate,
(3) diisopropylsulfate,
(4) dibutylsulfate,
(5) di-s-butylsulfate,
(6) dipentylsulfate,
(7) dihexylsulfate,
(8) diheptylsulfate and
(9) dioctylsulfate yields, respectively, (1) 7α,17α-dimethylestradiol 3-ethyl ether (II),
(2) 7α,17α-dimethylestradiol 3-propyl ether (II),
(3) 7α,17α-dimethylestradiol 3-isopropyl ether (II),
(4) 7α,17α-dimethylestradiol 3-butyl ether (II),
(5) 7α,17α-dimethylestradiol 3-s-butyl ether (II),
(6) 7α,17α-dimethylestradiol 3-pentyl ether (II),
(7) 7α,17α-dimethylestradiol 3-hexyl ether (II),
(8) 7α,17α-dimethylestradiol 3-heptyl ether (II) and
(9) 7α,17α-dimethylestradiol 3-octyl ether (II).

Following the procedure of example 8 but substituting for 7α-methylestrone as starting material (1) 7α-methyl-17α-ethylestradiol (II),
(2) 7α-methyl-17α-propylestradiol (II),
(3) 7α-methyl-17α-butylestradiol (II),
(4) 7α-methyl-17α-(2-butynyl)estradiol (II),
(5) 7α-methyl-17α(1,2-butadienyl)estradiol (IIa) etc., yields, respectively, (1) 7α-methyl-17α-ethylestradiol 3-methyl ether (II),
(2) 7α-methyl-17α-propylestradiol 3-methyl ether (II),
(3) 7α-methyl-17α-butylestradiol 3-methyl ether (II),
(4) 7α-methyl-17α-(2-butynyl)estradiol 3-methyl ether (II),
(5) 7α-methyl-17α(1,2-butadienyl)estradiol 3-methyl ether (IIa), etc.

EXAMPLE 19

7α,17α-dimethylestradiol 3-tetradhydropyranyl ether (II)

Following the procedure of example 9, but substituting for 7α-methylestrone as starting material (1) 7α,17α-dimethylestradiol (II),
(2) 7α-methyl-17α-ethylestradiol (II),
(3) 7-methyl-17α-propylestradiol (II),
(4) 7α-methyl-17α-butylestradiol (II), and (5) 7α-methyl-17α-(2-butynyl)estradiol (II),
(6) 7α-methyl-17α-(1,2-butadienyl)estradiol (IIa), yields, respectively, (1) 7α,17α-dimethylestradiol 3-tetrahydropyranyl ether (II),
(2) 7α-methyl -17α-ethylestradiol 3-tetrahydropyranyl ether (II),
(3) 7α-methyl-17α-propylestradiol 3-tetrahydropyranyl ether (II),
(4) 7α-methyl-17α-butylestradiol 3-tetradhydropyranyl ether (II) and
(5) 7α-methyl-17α-(2-butynyl)estradiol 3-tetrahydropyranyl ether (II),
(6) 7α-methyl-17α-(1,2-butadienyl)estradiol 3 - tetrahydropyranyl ether (IIa)

EXAMPLE 20

7α,17α-dimethylestradiol 3-trimethylsilyl ether (II)

To a suspension of 4 g. of 7α,17α-dimethylestradiol (II) in 10 ml. of dry acetone, 6.5 ml. of hexamethyldisilazane is added. The mixture is stirred for about 4 days and then evaporated to dryness. The residue is dissolved in a mixture of methylene chloride and Skellysolve B and chromatographed over a 200 g. column of Florisil. The product is eluted with Skellysolve B containing up to 10 percent of acetone to give 7α,17α-dimethylestradiol 3-trimethylsilyl ether (II).

Following the procedure of example 20 but substituting other disilazanes for hexamethyldisilazane, such as symmetrical diphenyltetramethyldisilazane, hexaamyldisilazane, etc., yields respectively, 7α,17α-dimethylestradiol 3-phenyldimethylsilyl ether (II), 7α,17α-dimethylestradiol 3-triamylsilyl ether (II), etc.

The reactions of example 20 and the paragraph thereafter are preferably carried out with the addition of a few drops to 2 ml. of trimethylsilyl chloride.

In place of acetone in example 20, other inert dry solvents, such as tetrahydrofuran, dioxane, methylene chloride and the like, can be utilized.

Following the procedure of example 20 but substituting for 7α,17α-dimethylestradiol (II) as starting material the following:

(1) 7α-methyl-17α-ethylestradiol (II),
(2) 7α-methyl-17α-propylestradiol (II),
(3) 7α-methyl-17α-butylestradiol (II),
(4) 7α-methyl-17α-(2-butynyl)estradiol (II)
(5) 7α-methyl-17α-(1,2-butadienyl)estradiol (IIa) etc., yields, respectively, (1) 7α-methyl-17α-ethylestradiol 3-trimethylsilyl ether (II),
(2) 7α-methyl-17α-propylestradiol 3-trimethylsilyl ether (II),
(3) 7α-methyl-17α-butylestradiol 3-trimethylsilyl ether (II),
(4) 7α-methyl-17α-(2-butynyl)estradiol 3-trimethylsilyl ether (II),
(5) 7α-methyl-17α-(1,2-butadienyl)estradiol 3-trimethylsilyl ether (IIa), etc.

Following the procedure of example 20 but substituting other starting materials for 7α,17α-dimethyl estradiol (II), such as 7α-methyl-17α-ethylestradiol 17-acetate (II), 7α-methyl-17α-(2-butynyl)estradiol 17-phenylacetate (II), etc., yields, respectively, 7α-methyl-17α-ethylestradiol 3-trimethylsilyl ether 17-acetate (II), 7α-methyl-17α-(2-butynyl)estradiol 3-trimethylether 17-phenylacetate (II), etc.

Following the procedure of example 20, some disilylation occurs, producing 7α-methyl-17α-alkylated estradiol 3,17-bis-trimethylsilyl ethers (II). Following the procedure of example 20 but increasing the amount of hexamethyldisilizane from 6.5 ml. to 10 ml. (and if desired increasing the reaction time) results in the formation of mainly 7α-methyl-17α-alkylated estradiol 3,17-bistrimethylsilyl ether (II), which can be purified by chromatography as described above.

Following the modified procedure of example 20 of the immediately preceding paragraph employing increased amounts of disilizanes, but substituting other disilizanes for hexamethyldisilizane, such as symmetrical diphenyltetramethyldisilazane, hexaamyldisilizane, etc., yields, respectively, 7α-methyl-17α-alkylated 3,17-bisphenyldimethylsilyl ether (II), 7α-methyl-17α-alkylated 3,17-bistriamylsilyl ether (II), etc.

The 7α,17α-dimethylestradiol 3-silyl ethers (II) exhibit strong estrogenic, antifertility and gonadatropin suppressing activities. They can be administered orally or, preferably, by injection.

EXAMPLE 21

(a) 7α,17α-dimethylestradiol 3-acetate (II)

To 1 g. of 7α,17α-dimethylestradiol (II), 2 ml. of pyridine and 1 ml. of acetic anhydride is added. The reaction mixture is kept at room temperature for about 3 hours; water is then added to precipitate the product (II) and destroy the excess acetic anhydride. Recrystallization from acetone and Skellysolve B yields 7α-methylestrone 3-acetate (II).

Following the procedure of example 21 but substituting for acetic anhydride the following:

(1) benzoic acid anhydride,
(2) propionic anhydride,
(3) i-butyryl chloride,
(4) valeryl chloride,
(5) decanoyl chloride,
(6) hexanoic anhydride,
(7) sec. octanoic anhydride
(8) capric anhydride,
(9) undecyl anhydride,
(10) dodecanoyl chloride, etc., yields, respectively, (1) 7α,17α-dimethylestradiol 3-benzoate (II),
(2) 7α,17α-dimethylestradiol 3-propionate (II),
(3) 7α,17α-dimethylestradiol 3-i-butyrate (II),
(4) 7α,17α-dimethylestradiol 3-valerate (II),
(5) 7α,17α-dimethylestradiol 3-decanoate (II),
(6) 7α,17α-dimethylestradiol 3-hexanoate (II),
(7) 7α,17α-dimethylestradiol 3-sec. octanoate (II),
(8) 7α,17α-dimethylestradiol 3-caproate (II),
(9) 7α,17α-dimethylestradiol 3-undecanoate (II),
(10) 7α,17α-dimethylestradiol 3-dodeconate (II), etc.

Following the procedure of example 21 (a) but substituting for 7α,17α-dimethylestradiol (II) as starting material (1) 7α-methyl-17α-ethylestradiol (II),
(2) 7α-methyl-17α-propylestradiol (II),
(3) 7α-methyl-17α-butylestradiol (II),
(4) 7α-methyl-17α-(2-butynyl)estradiol (II),
(5) 7α-methyl-17α-(1,2 butadienyl)estradiol (IIa) etc., yields, respectively, (1) 7α-methyl-17α-ethylestradiol 3-acetate (II),
(2) 7α-methyl-17α-butylestradiol 3-acetate (II),
(4) 7α-methyl-17α-(2-butynyl)estradiol 3-acetate (II),
(5) 7α-methyl-17α-(1,2-butadienyl)estradiol 3-acetate (IIa) etc.
(b) 7α,17α-dimethylestradiol 3,17-diphenylacetate (II)

A mixture of 0.75 ml. of trifluoroacetic anhydride and 1.5 g. of phenylacetic acid was heated at about 70° C. for about 10 minutes, cooled in an ice bath and 600 mg. of 7α,17α-dimethylestradiol (II) added. The ice bath was removed and after about 2 hours water was added to the mixture. The crude product was extracted with ether, washed first with dilute sodium carbonate solution, then water, dried over magnesium sulfate and filtered. The solvent was removed leaving a residue of 7α,17α-dimethylestradiol 3,17-diphenylacetate (II). The product can be further purified if desired by chromotography over silica gel and by crystallization.

Following the procedure of example 21 (b) but substituting for phenylacetic acid other acids, such as acetic, propionic, butyric, isobutyric, valeric, decanoic, acrylic, benzoic, naphthoic, phenylpropionic, cyclopentylpropionic, cyclohexyl-carboxylic, etc., yields the corresponding 3,17-diester of 7α,17α-dimethylestradiol (II).

Following the procedure of example 21 (b) and the paragraph thereafter but substituting for 7α,17α-dimethylestradiol (II) other starting materials, such as 7α-methyl-17α-ethylestradiol (II), 7α-methyl-17α-butylestradiol (II), 7α-methyl-17 α-pentylestradiol (II), 7α-methyl-17α-hexylestradiol (II), yields the corresponding 7α-methyl-17α-alkylestradiol 3,17-diester (II).

Following the procedure of example 21 (b) and the paragraph thereafter but substituting for 7α,17α-dimethylestradiol the 3-alkyl ethers of 7α-methyl-17αalkylestradiol yields the corresponding 7α-methyl-17α-alkylestradiol 3-alkyl ether 17-acylate.

(c) 7α,17α-dimethylestradiol 17-phenylacetate (II)

The 7α,17α-dimethylestradiol 3,17-diphenylacetate (II) obtained in example 21 (b) is chromotographed through a column of alumina (Grade (II) (neutral). The 3-ester group is removed and 7α,17α-dimethylestradiol 17-phenylacetate (II) is obtained.

Following the procedure of example 21 (c) but substituting for 7α,17α-dimethylestradiol 3,17-diphenylacetate (II) other 3,17-diesters of 7α,17α-dimethylestradiol such as the 3,17-diacetate, 3,17-dipropionate, 3,17-dibutyrate, 3,17-divalerate, 3,17-dibenzoate, 3,17-dicyclopentylpropionate, etc., yields the corresponding 7α,17α-dimethylestradiol 17-ester (II).

Following the procedure of example 21 (c) and the paragraph thereafter but substituting for 7α,17α-dimethylestradiol 3,17-diesters (II) other starting materials, such as a 7α-methyl 17α-propylestradiol 3,17-diester (II), 7α-methyl-17α-butylestradiol 3,17-diester (II), etc., yields the corresponding 7α-methyl-17α-alkylestradiol 17-ester (II).

An alternate procedure for the preparation of 7α,17α-dimethylestradiol 17-phenylacetate is to use mild basic hydrolysis. To a solution of 2.5 g. of potassium carbonate in 25 ml. of water is added 225 ml. of methanol, followed by 5.0 g. of 7α,17α-dimethylestradiol 3,17-diphenylacetate (II). The mixture is stirred for about 2 hours at about 20° C. then is poured into 700 ml. of water with efficient stirring, resulting in precipitation of 7α,17α-dimethylestradiol 17-phenylacetate (II), which is then separated, e.g., by filtration, and dried. The product can be further purified by chromatography over Florisil or alumina as described above.

Following the alternate procedure of example 21 (c) given immediately above but substituting for 7α,17α-dimethylestradiol 3,17-diphenylacetate (II) other 3,17-diesters of 7α-methyl-17α-alkylestradiols yields the corresponding 7α-methyl-17α-alkylestradiol 17-ester (II).

(d) 7α,17α-dimethylestradiol 17α-trimethylsilyl ether (II)

Following the procedure of example 20 but substituting 7α,17α-dimethylestradiol 3-acetate (II) as starting material yields 7α,17α-dimethylestradiol 3-acetate 17α-trimethylsilyl ether (II). Following the procedure of example 21 (c) results in the hydrolysis of 7α,17α-dimethylestradiol 3-acetate 17α-trimethylsilyl ether (II) to give 7α,17α-dimethylestradiol 17α-trimethylsilyl ether (II). By substituting other 7α-methyl-17α-alkylatedestradiol 3-acylates (II) as starting materials yields the corresponding 7α-methyl-17α-alkylestradiol 17α-trimethylsilyl ethers (II).

As indicated above, the compounds of this invention are useful for their estrogenic activity. Administration to mammals depends on the particular compound involved, route of administration, severity of the condition being treated and the individual's response thereto. In general, a dose of between about 0.01 mg. to about 5 mg. of each of the compounds exemplified in examples 12 through 21 and embraced within formula 11 is given orally once a day or subcutaneously or intramuscularly in a dose of 0.05 to 10 mg. weekly to monthly in the treatment of conditions incident to the foregoing activity when incorporated in conventional pharmaceutical compositions.

The following examples illustrate the incorporation of the active ingredients of this invention in pharmaceutical formulation for use as estrogenics.

EXAMPLE 22

Compressed tablets

A lot of 10,000 compressed tablets, each containing 0.05 mg. of 7α,17α-dimethylestradiol or 7α-methyl-17α-(2-butynyl)-estradiol 3-methylether is prepared from the following ingredients:

| | |
|---|---|
| 7α,17α-dimethylestradiol or 7α-methyl-17α-(2-butynyl)estradiol 3-methylether | 0.5 gm. |
| Dicalcium phosphate | 2500 gm. |
| Methylcellulose, USP (15 cps.) | 65 gm. |
| Talc, bolted | 450 gm. |
| Calcium stearate, fine powder | 35 gm. |

The 7α,17α-dimethylestradiol or 7α-methyl-17α-(2-butynyl)estradiol 3-methylether and dicalcium phosphate are mixed well, granulated with 7.5 percent solution of methylcellulose in water, passed through a No. 8 screen and dried at 120° F. The dried granules are passed through a No. 12 screen, mixed thoroughly with the talc and stearate and compressed into tablets.

EXAMPLE 23

Hard gelatin capsules

A lot of 1000 hard gelatin capsules, each containing 0.5 mg. of 7α,17α-dimethylestradiol or 7α-methyl-17α-(2-butynyl)estradiol 3-methyl ether is prepared from the following ingredients:

| | |
|---|---|
| 7α,17α-dimethylestradiol or 7α-methyl-17α-(2-butynyl)estradiol 3-methyl ether | 0.5 gm. |
| Lactose | 150 gm. |
| Calcium stearate | 2 gm. |
| Talc | 3 gm. |

The lactose, talc and stearate are mixed well and incorporated into the mixture. The whole is mixed well and filled into two-piece hard gelatin capsules.

EXAMPLE 24

Soft gelatin capsules

A batch of 1000 soft gelatin capsules, each containing 0.5 mg. of 7α,17α-dimethylestradiol or 7α-methyl-17α(2-butynyl)estradiol 3-methyl ether and corn oil is prepared from the following materials:

| | |
|---|---|
| 7α,17α-dimethylestradiol or 7α-methyl-17α-(2-butynyl)estradiol 3-methyl ether | 0.5 gm. |
| Corn oil | q.s. |

A uniform dispersion of the active ingredient in the corn oil is prepared and the dispersion filled into soft gelatin capsules by conventional means.

EXAMPLE 25

Aqueous oral suspension

An aqueous oral suspension containing in each 5 ml. 0.5 mg. of 7α,17α-dimethylestradiol or 7α-methyl-17α-(2-butynyl)estradiol 3-methyl ether is prepared from the following materials:

| | |
|---|---|
| 7α,17α-dimethylestradiol or 7α-methyl-17α-(2-butynyl)estradiol 3-methyl ether micronized | 1.0 gm. |
| Methylparaben, USP | 7.5 gm. |
| Propylparaben, USP | 2.5 gm. |
| Saccharin sodium | 12.5 gm. |
| Cyclamate sodium | 2.5 gm. |
| Glycerin | 3000 ml. |
| Tragacanth powder | 100 gm. |
| Orange oil flavor | 10 gm. |
| F.D. and C. orange dye | 7.5 gm. |
| Deionized water, q.s. to | 10,000 ml. |

EXAMPLE 26

Aqueous suspension for injection

A suspending vehicle is prepared from the following materials:

| | |
|---|---|
| Polyethylene glycol 4000 | 30 gm. |

| Potassium chloride | 11.2 gm. |
| --- | --- |
| Polysorbate 80 | 2 gm. |
| Methylparaben | 1.8 gm. |
| Propylparaben | 0.2 gm. |
| Water for injection q.s. | 1000 ml. |

The parabens are added to a major portion of the water and are dissolved therein by stirring and heating to 65° C. The resulting solution is cooled to room temperature and the remainder of the ingredients are added and dissolved. The balance of the water to make up the required volume is then added and the solution sterilized by filtration. The sterile vehicle thus prepared is then mixed with 0.5 g. of 7α, 17α-dimethylestradiol or 7α-methyl-17α-(2-butynyl)estradiol 3-methyl ether which has been previously reduced to a particle size less than about 10 microns and sterilized with ethylene oxide gas. The mixture is passed through a sterilized colloid mill and filled under aseptic conditions into sterile containers which are then sealed.

Each milliliter of this suspension contains 0.5 mg. 7α,17α-dimethylestradiol or 7α-methyl-17α-(2-butynyl)estradiol 3-methyl ether.

As indicated above, the compounds of this invention, in addition to their use as estrogenics, when combined with progestins, e.g., 6α-methyl-17α-hydroxyprogesterone 17-acetate (Provera), 7α-methyl-17α-ethynyl-19-nortestosterone, 17α-hydroxy-6-methyl-16-methylene-4,6-pregnadiene-3,20-dione 17-acetate (Melengestrol acetate), etc., are useful for the prevention of ovulation in mammals. Administration to mammals depends on the particular progestin and estrogen involved and the individuals response thereto. In general, a dose of between about 0.01 mg. to about 5 mg. of each of the estrogens exemplified in examples 12 through 21 and embraced within formula II plus between about 1 mg. to about 100 mg. of a progestin is given at such time(s) in the mammalian ovulatory cycle as is suitable for the prevention of ovulation.

The following examples illustrate the incorporation of the active ingredients of this invention with progestins in pharmaceutical formulation for use as anovulatories.

EXAMPLE 27

Oral tablets 50,000 tablets for oral administration are prepared from the following types and amounts of materials. Each tablet contains 3.0 mg. of 6α-methyl-17α-hydroxyprogesterone 17-acetate and 0.03 mg. of 7α,17α-dimethylestradiol or 7α-methyl-17α-(2-butynyl)estradiol 3-methyl ether.

| 6α-methyl-17α-hydroxyprogesterone 17-acetate | 5 oz. |
| --- | --- |
| 7α-17α-dimethylestradiol or 7α-methyl-17α-(2-butynyl)estradiol 3-methyl ether | 23 grains |
| Lactose | 3 lbs. |

The finely powdered active ingredients and lactose are mixed well and granulated with syrup-starch paste. Starch and calcium stearate are used as lubricants in the compressing step.

EXAMPLE 28

Oral tablets 10,000 tablets for oral administration are prepared from the following types and amounts of ingredients. Each tablet contains 10 mg. of 6α-methyl-17α-hydroxyprogesterone 17-acetate and 0.05 mg. of 7α,17α-dimethylestradiol or 7α-methyl-17α-(2-butynyl)estradiol 3-methyl ether.

| 6α-methyl-17α-hydroxyprogesterone 17-acetate | 100 gms. |
| --- | --- |
| 7α,17α-dimethylestradiol or 7α-methyl-17α-(2-butynyl)estradiol 3-methyl ether | 0.5 gms. |
| Lactose | 2600 gms. |

The finely powdered active ingredients and lactose are mixed well and granulated with syrup-starch paste. Starch talc, and calcium stearate are used as lubricants in the compressing step.

EXAMPLE 29

Oral aqueous suspension

An aqueous suspension for oral administration, containing in each teaspoonful (approximately 5 ml.) 5 mg. of 6α-methyl-17α-hydroxyprogesterone 17-acetate and 0.2 mg. of 7α,17α-dimethylestradiol or 7α-methyl-17α-(2-butynyl)estradiol 3-methyl ether is prepared from the following types and amounts of ingredients:

| 6α-methyl-17α-hydroxyprogesterone 17-acetate | 1 gm. |
| --- | --- |
| 7α,17α-dimethylestradiol or 7α-methyl-17α-(2-butynyl)estradiol 3-methyl ether | 40 mg. |
| Preservative | 2 gms. |
| Flavor, q.s. | |
| Purified water U.S.P., a.s. ad 1000 mls. | |

The preservative and flavor are dissolved in the water. The micronized active ingredients are added and the whole is homogenized.

EXAMPLE 30

Oral gelatin capsules 1000 gelatin capsules for oral administration, each containing 10 mg. of 6α-methyl-17α-hydroxyprogesterone 17-acetate and 0.05 mg. of 7α,17α-dimethylestradiol or 7α-methyl-17α-(2-butynyl)estradiol 3-methyl ether are prepared from the following types and amounts of materials:

| 6α-methyl-17α-hydroxyprogesterone 17-acetate | 10 gms. |
| --- | --- |
| 7α,17α-dimethylestradiol or 7α-methyl-17α-(2-butynyl)estradiol 3-methyl ether | 50 mg. |
| Ingestible oil, q.s. | |

The micronized active ingredients and the oil are mixed and the mix is encapsulated by the usual techniques into gelatin capsules.

EXAMPLE 31

Oral tablets

Following the procedure of example 17, 5000 tablets are prepared from the following types and amounts of ingredients. Each tablet:

| 5 mg. 6α-methyl-17α-hydroxyprogesterone 17-acetate | 25 gm. |
| --- | --- |
| 0.01 mg. 7α,17α-dimethylestradiol or 7α-methyl-17α-(2-butynyl)estradiol 3-methyl ether | 50 mg. |
| 150 mg. lactose | 750 gm. |
| 3 mg. acacia | 15 gm. |
| 65 mg. starch, bolted | 325 gm. |
| 3 mg. calcium stearate | 15 gm. |

Tablets equally suited for the inhibition of ovulation are prepared by using 250 and 1000 mg., respectively, of the 7α,17α-dimethylestradiol or 7α-methyl 17α-(2-butynyl)estradiol 3-methyl ether in place of the 50 mg. in the above formulation.

While the procedures described above in examples 27 through 31 recite the use of the progestin 6α-methyl-17α-hydroxyprogesterone 17-acetate, other progestational compounds can be substituted therefor to provide similarly effective anovulatory pharmaceutical formulations; e.g., 7α-methyl-17α-ethynyl-19-nortestosterone, 17α-hydroxy-6-methyl-16-methylene-4,6-pregnadiene-3,20-dione 17-acetate, 17-hydroxy-19-nor-17α-pregn-5(10)-en-20-yn-3-one, 19-nor-17α-pregn-4-en-20-yne-3β, 17-diol 3,17-diacetate, 17-hydroxy-19-nor-17α-pregn-4-en-20-yn-3-one 17-acetate, 6α,21-dimethyl-17β-hydroxy-4-pregnen-20-yn-3-one, 6-chloro-17α-hydroxy-4,6-pregnadiene-3,20-dione 17-acetate, etc., can be employed instead of 6α-methyl-17α-hydroxyprogesterone 17-acetate.

We claim:

1. A compound of the formula

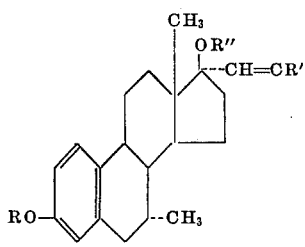

wherein R is selected from the group consisting of hydrogen, the acyl radical of a hydrocarbon carboxylic acid containing from one through eight carbon atoms, an alkyl radical containing from one through eight carbon atoms, tetrahydrofuranyl, tetrahydropyranyl, 5-substituted tetrahydropyranyl, and a silyl radical of the formula

wherein $R_1$, $R_2$ and $R_3$ are selected from the group consisting of alkyl of one through six carbon atoms and phenyl, R' is selected from the group consisting of hydrogen and methyl, hydrogen and ethyl, and ethylidene, and R" is selected from the group consisting of hydrogen, the acyl radical of a hydrocarbon carboxylic acid containing from one through 12 carbon atoms and a silyl radical of the formula

wherein $R_1$, $R_2$ and $R_3$ have the same meaning as above.

2. A compound of claim 1 wherein R and R" are hydrogen and R' is ethylidene, namely, 7α-methyl-17α-(1,2-butadienyl)estradiol having the formula

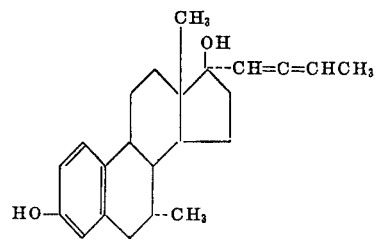

3. An oral pharmaceutical composition comprising:
   a. about 0.01 to about 5 mg. of 7α,17α-dimethylestradiol and
   b. about 1 to about 100 mg. of a progestin, dispersed in an oral pharmaceutical carrier.

4. A composition in accordance with claim 3 wherein the progestin is 7α-methyl-17α-ethynyl-19-nortestosterone.

5. A method of preventing ovulation in ovulating mammals comprising: orally administering to ovulating mammals an effective amount of
   a. 7α,17α-dimethylestradiol and
   b. a progestin.

6. A method of preventing ovulation in ovulating mammals in accordance with claim 5 wherein the progestin is 7α-methyl-17α-ethynyl-19-nortestosterone.

* * * * *